(12) United States Patent
Sun et al.

(10) Patent No.: US 12,391,504 B2
(45) Date of Patent: Aug. 19, 2025

(54) MOTOR CONTROLLING SYSTEM FOR APPLICATION IN APPARATUS HAVING ROLL-TO-ROLL MECHANISM

(71) Applicants: KAPITO INC., Hsinchu (TW); Feng-Tso Sun, Hsinchu (TW); Yi-Ting Yeh, Hsinchu (TW); Feng-Yu Sun, Hsinchu (TW)

(72) Inventors: Feng-Tso Sun, Hsinchu (TW); Yi-Ting Yeh, Hsinchu (TW); Feng-Yu Sun, Hsinchu (TW); Po-Han Chou, Hsinchu (TW); Yun-Yi Chen, Hsinchu (TW); Hui-Pu Chang, Hsinchu (TW); Jyun-Tang Huang, Hsinchu (TW)

(73) Assignees: Kapito Inc., Hsinchu (TW); Feng-Tso Sun, Hsinchu (TW); Yi-Ting Yeh, Hsinchu (TW); Feng-Yu Sun, Hsinchu (TW)

( * ) Notice: Subject to any disclaimer, the term of this patent is extended or adjusted under 35 U.S.C. 154(b) by 448 days.

(21) Appl. No.: 17/878,191

(22) Filed: Aug. 1, 2022

(65) Prior Publication Data
US 2023/0061439 A1    Mar. 2, 2023

(30) Foreign Application Priority Data
Aug. 27, 2021   (TW) .................................. 110131882

(51) Int. Cl.
*B65H 26/02*   (2006.01)
*G06T 7/00*    (2017.01)
(Continued)

(52) U.S. Cl.
CPC ............. *B65H 26/02* (2013.01); *G06T 7/001* (2013.01); *B65H 2513/11* (2013.01);
(Continued)

(58) Field of Classification Search
CPC ...... B65H 26/00; B65H 26/02; B65H 26/025; B65H 2513/00; B65H 2513/10;
(Continued)

(56) References Cited

U.S. PATENT DOCUMENTS 5,990,468 A * 11/1999 Cornuejols ........... G06T 7/0004
                                                250/559.46
11,100,626 B2 * 8/2021 Roepke ............ G05B 19/41805
(Continued)

*Primary Examiner* — John R Lee
(74) *Attorney, Agent, or Firm* — ANOVA LAW GROUP, PLLC

(57) ABSTRACT

A motor controlling system is disclosed. The motor controlling system is integrated in an apparatus having roll-to-roll mechanism, and comprises a linear light source, at least one camera and a modular electronic device. When a continuous web material is discharged by an unwinding unit of the roll-to-roll mechanism so as to be further transferred to an inspection unit, the at least one camera is controlled by the modular electronic device to capture at least one material image. Subsequently, the modular electronic device conducts a defection inspection for a segment of the continuous web material by applying an image process to the at least one material image. As a result, in case of there being at least one defect found, the modular electronic device stops a plurality of motors of the apparatus from running, thereby making the segment of the continuous web material be positioned on an inspection platform.

13 Claims, 7 Drawing Sheets

(51) Int. Cl.
 *H04N 23/56* (2023.01)
 *H04N 23/90* (2023.01)
(52) U.S. Cl.
 CPC ...... *B65H 2513/50* (2013.01); *B65H 2553/42* (2013.01); *G06T 2207/30124* (2013.01); *H04N 23/56* (2023.01); *H04N 23/90* (2023.01)
(58) Field of Classification Search
 CPC ............ B65H 2513/11; B65H 2513/50; B65H 2553/42; B65H 2553/40; G06T 2207/30124; G06T 2207/30108; G06T 2207/30; G06T 7/001; G06T 7/0004; G06T 7/0002; G06T 7/00; H04N 23/56; H04N 23/90; H04N 23/57; H04N 23/60; H04N 23/61; H04N 23/62; G01N 2021/8416; G01N 2021/8411; G01N 21/88; G01N 21/8803; G01N 21/8806; G01N 21/8851; G01N 2021/8854; G01N 2021/8858; G01N 2021/8861; G01N 2021/8864; G01N 2021/8887; G01N 2021/898; G01N 2021/8893; G01N 21/89; G01N 21/8901; G01N 21/8903; G01N 2021/8908; G01N 2021/8909; G01N 21/8915; G01N 21/8914; G01N 21/8916; G01N 21/892; G01N 21/8921; G01N 21/8922; G01N 2021/8924; G01N 2021/8925; G01N 2021/8927; G01N 2021/8928; G01N 21/894; G01N 21/896; G01N 2021/8962; G01N 2021/8965; G01N 2021/8967; G01N 21/898; G01N 21/8983; G01N 33/367; G01N 33/36
 See application file for complete search history.

(56) References Cited

U.S. PATENT DOCUMENTS

| | | | |
|---|---|---|---|
| 11,203,494 B2* | 12/2021 | Sun | B65G 61/00 |
| 11,341,630 B2* | 5/2022 | Sugihara | G06T 7/0004 |
| 11,874,232 B2* | 1/2024 | Batista | G01N 21/8903 |
| 11,890,772 B2* | 2/2024 | Acciari | B26D 7/27 |
| 12,111,268 B2* | 10/2024 | Sun | G01N 21/8903 |
| 2014/0174127 A1* | 6/2014 | Dalstra | G01N 21/90 65/29.11 |
| 2020/0160497 A1* | 5/2020 | Shah | G06T 7/70 |
| 2020/0348242 A1* | 11/2020 | Watanabe | G01N 23/18 |
| 2021/0024297 A1* | 1/2021 | Sun | B65G 61/00 |
| 2021/0079588 A1* | 3/2021 | Mantellassi | B65H 35/008 |
| 2021/0358109 A1* | 11/2021 | Sugihara | G01N 21/8901 |
| 2021/0383530 A1* | 12/2021 | Peleg | G06T 7/0008 |
| 2021/0394387 A1* | 12/2021 | Acciari | B26D 7/27 |
| 2022/0146436 A1* | 5/2022 | Batista | G01N 21/8422 |
| 2023/0061439 A1* | 3/2023 | Sun | G06T 7/001 |
| 2023/0117656 A1* | 4/2023 | Sun | G01N 21/8851 382/149 |
| 2023/0168208 A1* | 6/2023 | Sun | H04N 23/56 348/92 |
| 2024/0282096 A1* | 8/2024 | Sun | G06T 7/0004 |

* cited by examiner

MOTOR CONTROLLING SYSTEM FOR APPLICATION IN APPARATUS HAVING ROLL-TO-ROLL MECHANISM

CROSS-REFERENCE TO RELATED APPLICATION

This application claims the priority of Taiwan Patent Application No. 110131882, filed on Aug. 27, 2021, the content of which is incorporated by reference in its entirety.

TECHNICAL FIELD

The present invention relates to the technology field of apparatuses that all have roll-to-roll unit, and more particularly to a motor controlling system for application in apparatus having roll-to-roll mechanism.

BACKGROUND

It is well known that it is necessary to receive a defect inspection treatment for a woven article like cloth before being packed, and the defect inspection treatment is completed by an inspector through operating a fabric inspection machine (also called perching machine). Cloth manufactures certainly know that, a conventional fabric inspection machine commonly includes: an unwinding unit, a fabric spreading unit and a winding unit, where the fabric spreading unit consists of a first feed roller, an inspection platform and a second feed roller. The first feed roller is disposed between the unwinding unit and the inspection platform, and is adjacent to a top side of the inspection platform. On the other hand, the second feed roller is disposed between the winding unit and the inspection platform, and is adjacent to a bottom side of the inspection platform.

A defect inspection treatment consists of multiple steps. In first step, the inspector stands at the front of an operation table, and then controls the actions of the unwinding unit, the first roller, the second roller, and the winding unit by operating a controller put on the operation table, so as to properly regulate a feeding speed and a winding speed of a fabric that is discharged from the winding unit and rewound by the unwinding unit. At the end of the foregoing first step, there is a segment of the fabric is laid out on the inspection platform. In second step, the inspector checks the appearance of the fabric segment spread on the inspection platform detailedly, and then operates the controller to stop the transmission of the fabric in case of there being at least one defect found. In third step, the inspector judges whether the defects in the fabric segment is repairable or not. If yes, the inspector repairs the defects; otherwise, the inspector patches a label on said defect. Eventually, the inspector restarts the transmission of the fabric by operating the controller, so as to make the fabric segment that has been received the defect inspection treatment be wound by the winding unit.

However, the experienced inspectors have found the conventional fabric inspection machine exhibits many drawbacks when being applied in conducting the defect inspection treatment. The drawbacks are summarized as follows.

(1) In the second step of the foregoing defect inspection treatment, the inspector checks the appearance by his eyes, so as to verify whether there are existing any defects in the fabric segment or not. No doubt such way must lead the missed inspection to occur.

(2) During the defect inspection treatment, the inspector manually stops the transmission of the fabric in case of there being defects found, and then manually restarts the transmission of the fabric after repairing the defects and/or patches a label on each of the defects. After repeating several times of the stopping and the restarting of the transmission of the fabric, it is found that two end sides of a fabric roll that is wound on the winding unit both do not have a flat profile.

It is understood that, the unwinding unit and the winding unit constitute a roll-to-roll mechanism, such that the fabric inspection machine is regarded as one kind of apparatus having roll-to-roll mechanism. On the other hand, the roll-to-roll mechanism has been integrated in a variety of article manufacturing systems nowadays, including meal foil manufacturing system, metal thin sheet manufacturing system, touch panel manufacturing system, flexible circuit board manufacturing system, and flexible solar cell manufacturing system. Moreover, according to above descriptions, it is understood that there is still room for improvement in the apparatus having roll-to-roll mechanism. In view of this fact, inventors of the present application have made great efforts to make inventive research and eventually provided a motor controlling system for application in apparatus having roll-to-roll mechanism.

SUMMARY

The primary objective of the present invention is to disclose a motor controlling system for application in an apparatus having roll-to-roll mechanism. The motor controlling system includes a linear light source, at least one camera and a modular electronic device, and the apparatus includes an inspection unit and a roll-to-roll mechanism consisting of an unwinding unit and a winding unit. When a roll of a continuous web material is discharged from the unwinding unit so as to be further transferred to the inspection unit, the at least one camera is controlled by the modular electronic device to acquire at least one image from the continuous web material. Subsequently, the modular electronic device conducts a defection inspection for a segment of the continuous web material by applying an image process to the at least one material image. In case of there being at least one defect found, the modular electronic device stops a plurality of motors of the apparatus from running, thereby making the segment of the continuous web material be positioned on an inspection platform of the inspection unit.

For achieving the primary objective mentioned above, the present invention provides an embodiment of the motor controlling system, which is integrated in apparatus including an inspection unit and a roll-to-roll mechanism consisting of an unwinding unit and a winding unit and includes:
  a linear light source, being disposed at a first position for facing a first photographing region between the unwinding unit and the inspection unit;
  at least one first camera, being disposed at a second position for facing the first photographing region; and
  a modular electronic device, being coupled to the linear light source and the at least one first camera, and including a processor, a memory and a human machine interface (HMI), where the memory stores an application program, and the processor being coupled to the memory and the human machine interface;
  where the application program includes instructions, such that in case the application program is executed, the processor being configured for:
  controlling the linear light source to emit a first detection light for irradiating the first photographing region in case of a roll of a continuous web material being discharged by the unwinding unit by a feeding speed;

controlling the at least one first camera to acquire at least one material image from a first segment of the continuous web material that is in the first photographing region;

applying at least one image process to the at least one material image, so as to generate a first material feature image;

extracting a plurality of defect features from the first material feature image, and then determining whether there are existing any defects in the first segment of the continuous web material by matching the plurality of defect features with a plurality of reference defect features;

stopping a first motor of the unwinding unit, at least one second motor of the inspection unit, and a third motor of the winding unit from running in case of there being at least one defect detected from the first segment of the continuous web material, so as to make the first segment of the continuous web material be positioned on an inspection platform of the inspection unit;

restarting the first motor, the at least one second motor and the third motor to run after receiving a transmission restarting command transmitted by the human machine interface.

In one embodiment, the motor controlling system further includes:

a first rotation speed sensor, being connected to the first motor for monitoring a first rotation speed of the first motor;

a second rotation speed sensor, being connected to said second motor for monitoring a second rotation speed of said second motor;

a third rotation speed sensor, being connected to the third motor for monitoring a third rotation speed of the third motor.

In one embodiment, after the human machine interface transmits the transmission restarting command to the processor, the processor restarts the first motor, said second motor and the third motor to run by the first rotation speed, the second rotation speed and the third rotation speed, respectively.

In one embodiment, the at least one first camera acquires material image from the first segment of the continuous web material by a shutter speed, and the shutter speed is positively correlated to the feeding speed.

In one embodiment, the application program consists of a plurality of subprograms, and the plurality of subprograms include:

a first subprogram, being compiled to be integrated in the application program by one type of programming language, and including instructions for configuring the processor to apply the at least one image process to the at least one material image for generating the first material feature image, and to extract the plurality of defect features from the first material feature image;

a second subprogram, being compiled to be integrated in the application program by one type of programming language, and including instructions for configuring the processor to determine whether there are existing any defects in the first segment of the continuous web material by matching the plurality of defect features with the plurality of reference defect features;

a third subprogram, being compiled to be integrated in the application program by one type of programming language, and including instructions for configuring the processor to stop the first motor, said second motor and the third motor from running, or restarting the first motor, said second motor and the third motor to run;

a fourth subprogram, being compiled to be integrated in the application program by one type of programming language, and including instructions for configuring the processor to control the at least one first camera; and a fifth subprogram, being compiled to be integrated in the application program by one type of programming language, and including instructions for configuring the processor to real-time monitor a movement of the continuous web material.

In one embodiment, the motor controlling system further includes:

a light source, being coupled to the modular electronic device, and being disposed at a third position for facing a second photographing region between the inspection unit and the winding unit;

a second camera, being coupled to the modular electronic device, and being disposed at a fourth position for facing the second photographing region;

where in case the application program is executed, the processor being configured for:

controlling the light source to emit a second detection light for irradiating the second photographing region in case of the winding unit running to wind the continuous web material by a material winding speed;

controlling the second camera to acquire a second image frame from a second segment of the continuous web material in the second photographing region; and applying at least one image process to the at least one material image, so as to generate a second material feature image.

In one embodiment, the plurality of subprograms further include a sixth subprogram, which is compiled to be integrated in the application program by one type of programming language, and includes instructions for configuring the processor to extract a plurality of material features from the second material feature image, and then to estimate a winding tension of the second segment of the continuous web material based on the plurality of material features.

In one embodiment, the modular electronic device transmits a tension adjustment command to the apparatus in case the winding tension is less than a lower threshold value or greater than an upper threshold value, such that the apparatus controls a tension adjusting assembly of the winding unit so as to properly regulate the winding tension.

In one practicable embodiment, the modular electronic device is an electronic device coupled to a control box of the apparatus, and the electronic device is selected from a group consisting of industrial computer, desktop computer, laptop computer, and all-in-one computer.

In another one practicable embodiment, the modular electronic device is integrated in a control box of the apparatus.

In one embodiment, the continuous web material is selected from a group consisting of fabric, meal foil, metal thin sheet, touch panel, flexible circuit board, and flexible solar cell.

BRIEF DESCRIPTION OF THE DRAWINGS

The invention as well as a preferred mode of use and advantages thereof will be best understood by referring to the following detailed description of an illustrative embodiment in conjunction with the accompanying drawings, where.

DETAILED DESCRIPTION

To more clearly describe a motor controlling system for application in apparatus having roll-to-roll mechanism according to the present invention, embodiments of the present invention will be described in detail with reference to the attached drawings hereinafter.

First Embodiment

Figure 1:
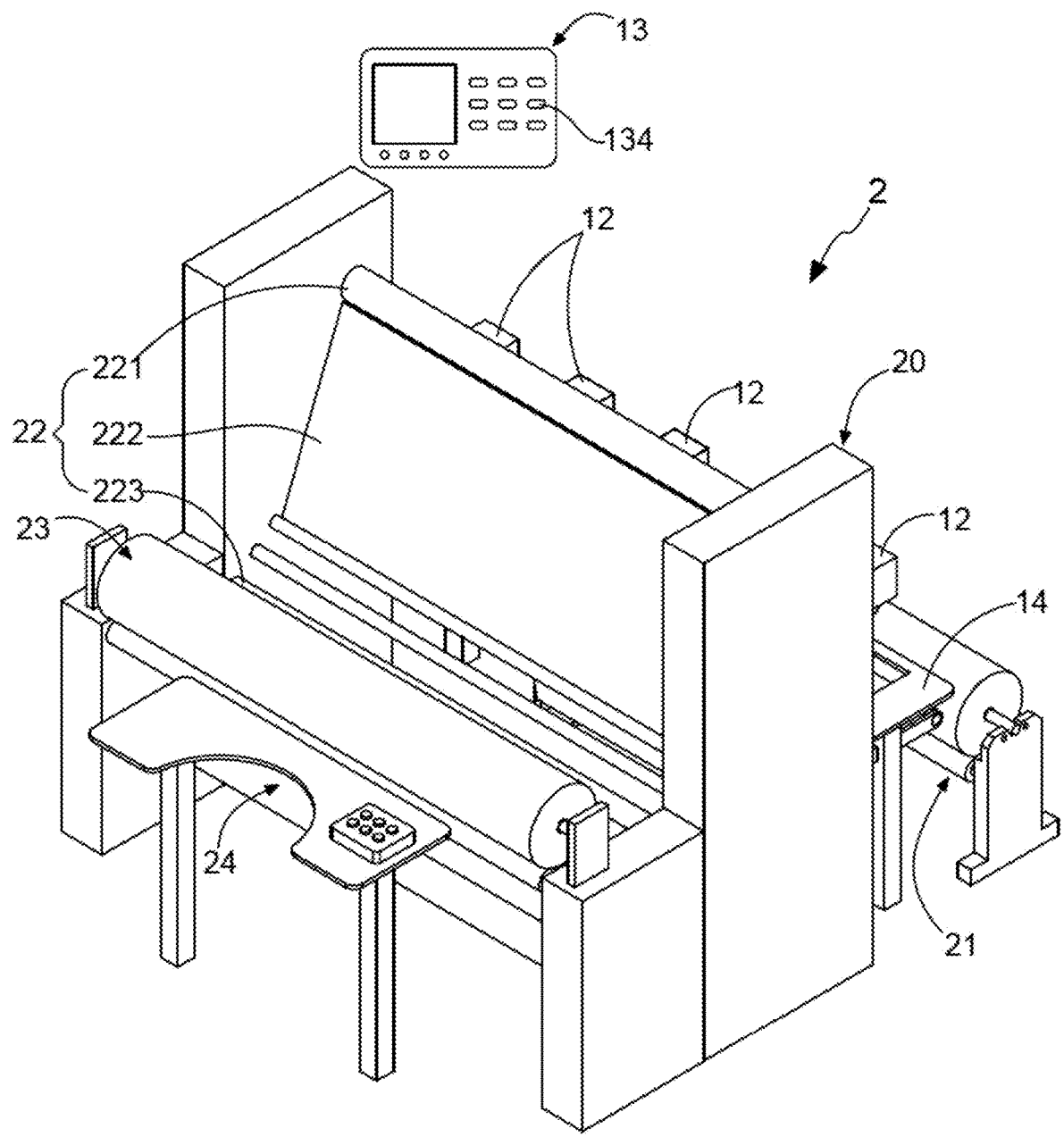
FIG. 1 shows a first stereo diagram of an apparatus including a roll-to-roll mechanism and a motor controlling system according to the present invention.
Figure 2:
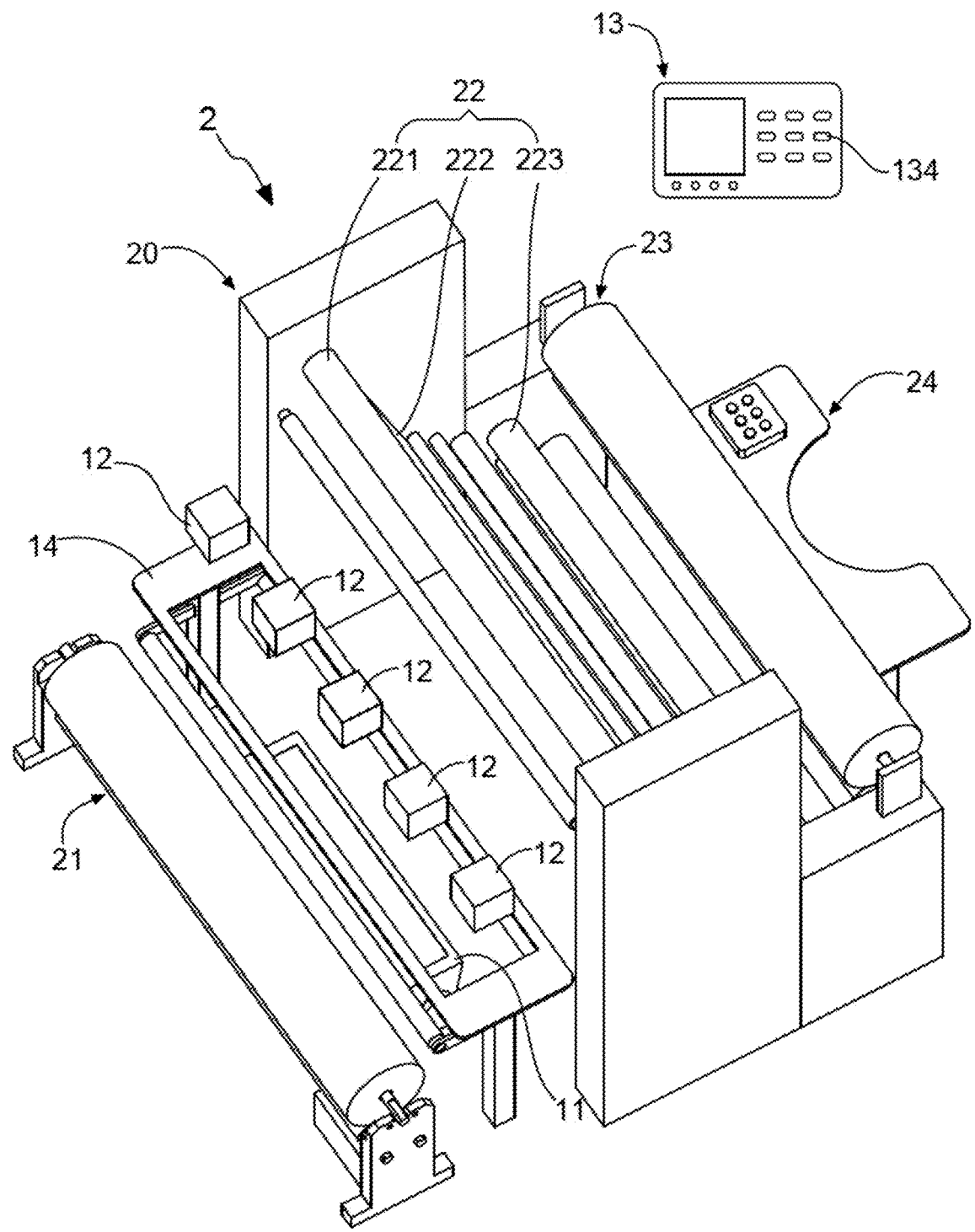
FIG. 2 shows a second stereo diagram of the apparatus.

With reference to FIG. 1, there is shown a first stereo diagram of an apparatus including a roll-to-roll mechanism and a motor controlling system according to the present invention. Moreover, FIG. 2 illustrates a second stereo diagram of the apparatus. As FIG. 1 and FIG. 2 show, the apparatus 2 is a fabric inspection machine (also called perching machine), and includes: a machine chassis 20, an unwinding unit 21, an inspection unit 22, a winding unit 23, and an operation table 24. It is understood that, the unwinding unit 21 and the winding unit 23 constitute a roll-to-roll mechanism, such that the fabric inspection machine is regarded as one kind of apparatus having one roll-to-roll mechanism. However, the roll-to-roll mechanism can also be integrated in other kinds of apparatuses, like meal foil manufacturing system, metal thin sheet manufacturing system, touch panel manufacturing system, flexible circuit board manufacturing system, or flexible solar cell manufacturing system. It is worth explaining that, FIG. 1 and FIG. 2 further depict that the inspection unit 22 includes a first roller 221, an inspection platform 222 and a second roller 222.

Figure 3:
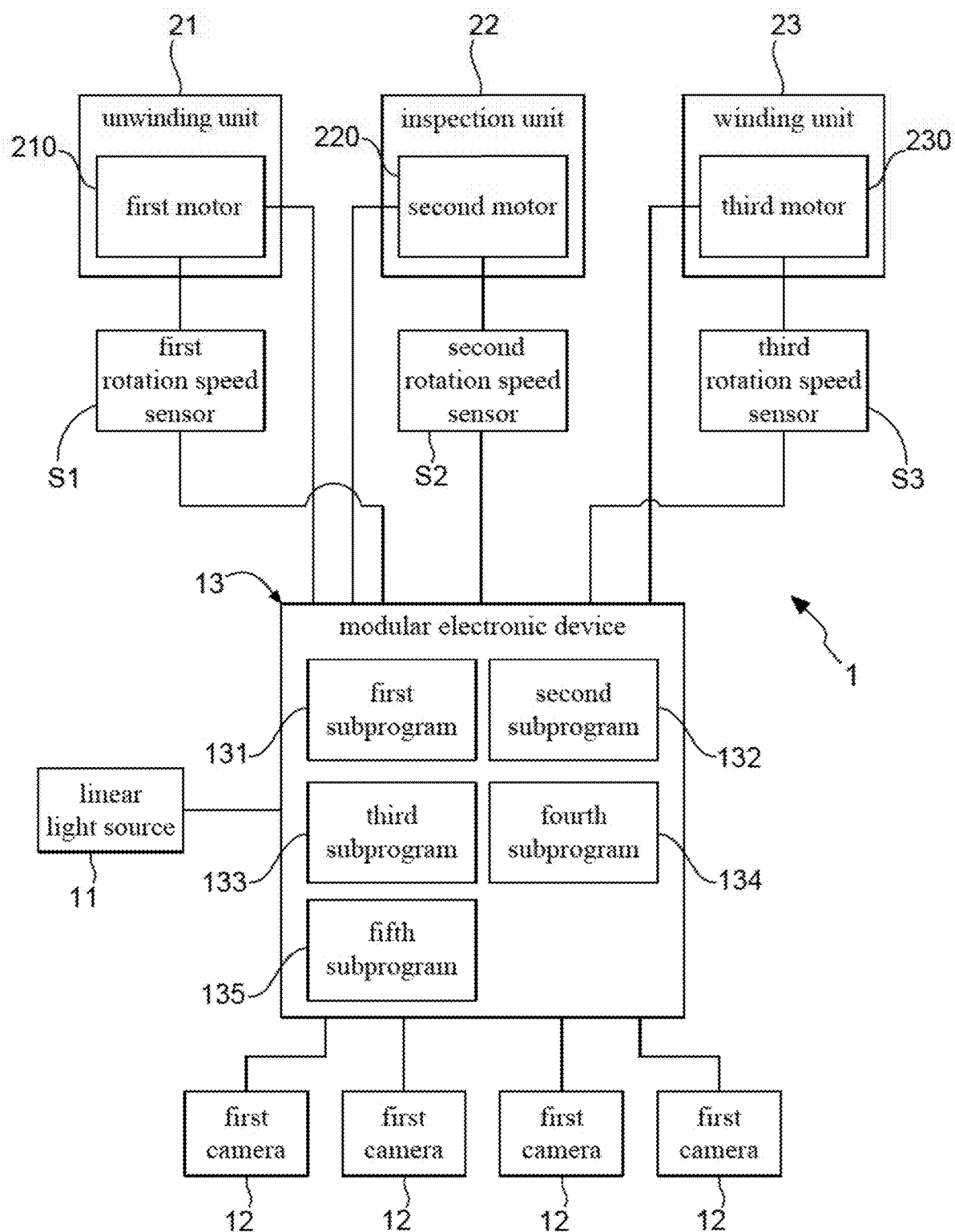
FIG. 3 shows a first block diagram of the motor controlling system according to the present invention.
Figure 4:
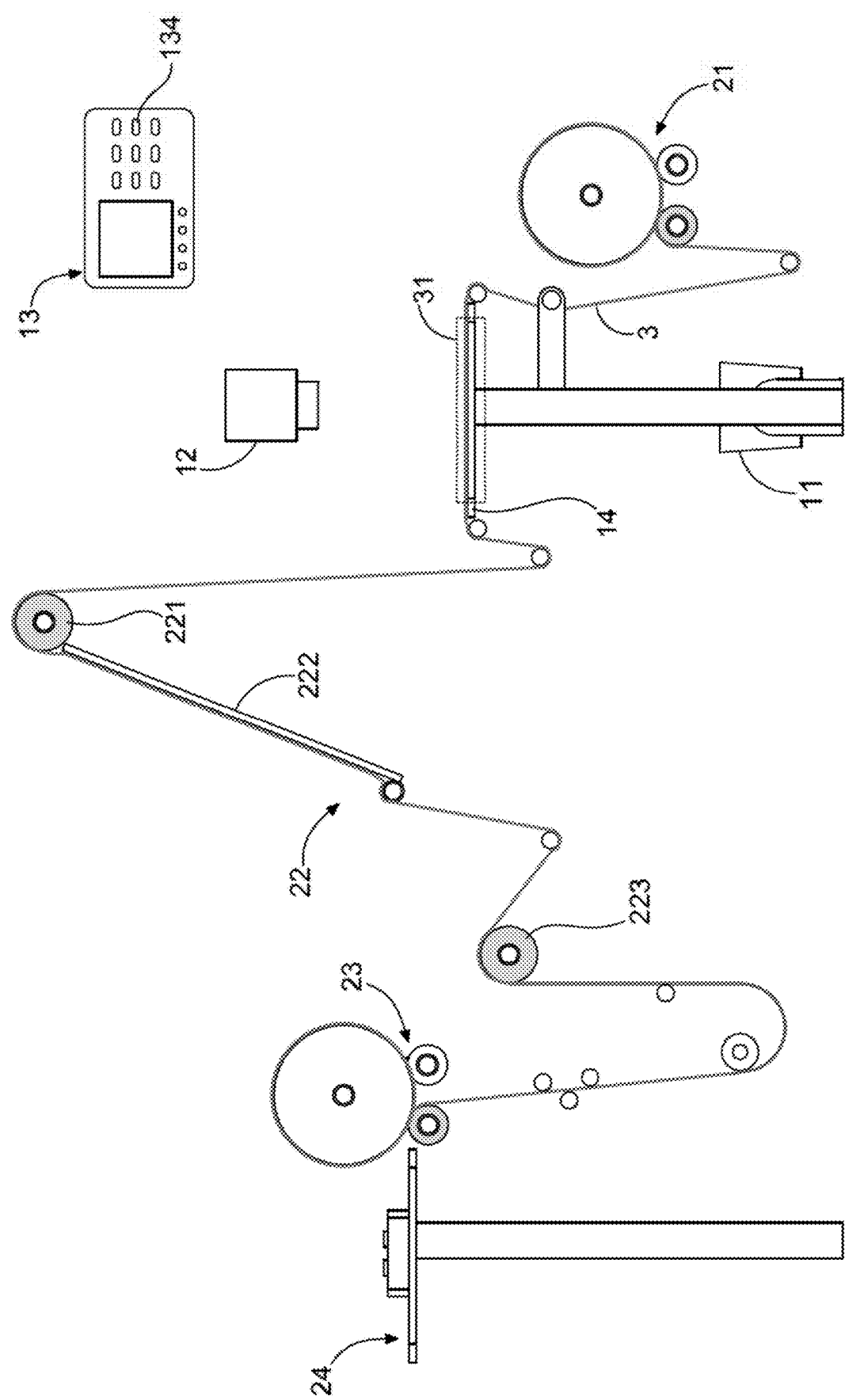
FIG. 4 shows a first side view of an unwinding unit, an inspection unit, a winding unit, and an operation table they are shown in FIG. 1.
Figure 5:
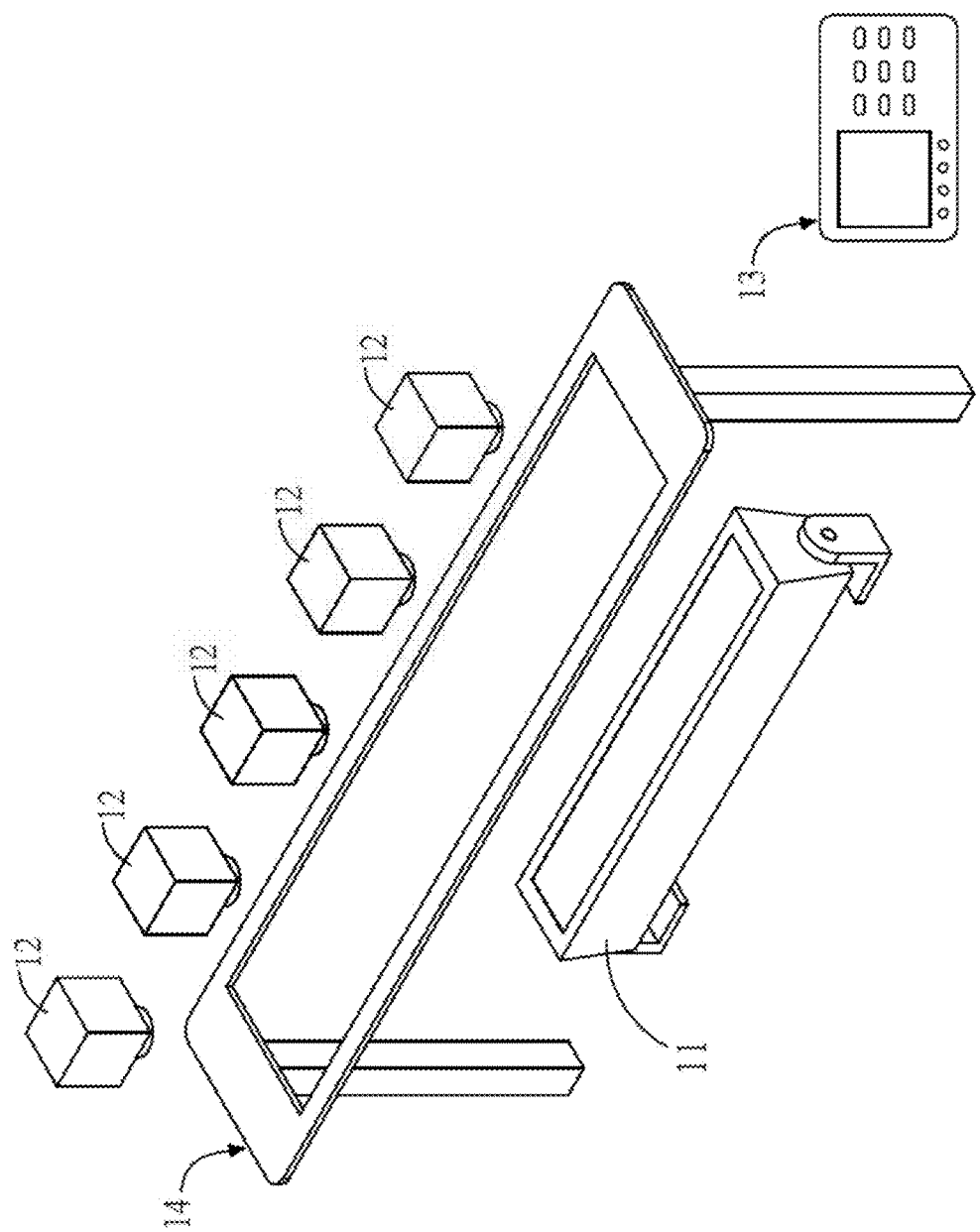
FIG. 5 shows a stereo diagram of a linear light source, at least one first camera, an inspection unit, and a supporting framework they are shown in FIG. 1.

Referring to FIG. 1 and FIG. 2 again, and please simultaneously refer to FIG. 3, in which a first block diagram of the motor controlling system is shown. On the other hand, FIG. 4 illustrates a first side view of the unwinding unit 21, the inspection unit 22, the winding unit 23, and the operation table 24 they are shown in FIG. 1. In the apparatus 2, the unwinding unit 21 has a first motor 210, the inspection unit 22 has at least one second motor 220, and the winding unit 23 has a third motor 230. As described in more detail below, a roll of a continuous web material 3 (i.e., fabric) is wound on a roller of the winding unit 23, and driving the first motor 210 to rotate makes the continuous web material 3 be discharged by the unwinding unit 21, and then be further transferred to the inspection unit 22.

According to the present invention, the motor controlling system 1 includes a linear light source 11, at least one first camera 12 and a modular electronic device 13, where the linear light source 11 is disposed at a first position for facing a first photographing region between the unwinding unit 21 and the inspection unit 22. Moreover, the at least one first camera 12 are disposed at a second position for facing the first photographing region. On the other hand, the modular electronic device 13 is coupled to the linear light source 11 and the at least one first camera 12, and includes a processor, a memory and a human machine interface (HMI). In which, the processor is coupled to the human machine interface and the memory, and the memory stores an application program that consists of a plurality of subprograms. By such arrangements, when the motor controlling system 1 is work normally, the processor accesses the memory so as to execute the application program, thereby making the processor be configured for conducting a plurality of functions.

In one practicable embodiment, the modular electronic device 13 is an electronic device coupled to a control box of the apparatus 2, and the electronic device is selected from a group consisting of industrial computer, desktop computer, laptop computer, and all-in-one computer. In another one practicable embodiment, the modular electronic device 13 can be integrated in a control box of the apparatus 2.

As FIG. 3 shows, the application program includes a first subprogram 131, a second subprogram 132, a third subprogram 133, a fourth subprogram 134, and a fifth subprogram 135, in which the fourth subprogram 134 is compiled to be integrated in the application program by one type of programming language, and includes instructions for configuring the processor to control the linear light source 11 to emit a first detection light for irradiating the first photographing region in case of a roll of a continuous web material 3 being discharged by the unwinding unit 21 by a feeding speed, and to control the at least one first camera 12 to acquire at least one material image from a first segment 31 of the continuous web material 3 that is in the first photographing region. It is worth further explaining that, the at least one first camera 12 acquires at least one material image from the first segment 31 of the continuous web material 3 by a shutter speed, and the shutter speed is positively correlated to the feeding speed. In addition, there is a supporting framework 14 disposed in the first photographing region, which is adapted for supporting the first segment 31 of the continuous web material 3, thereby making the first segment 31 be laid out in the first photographing region.

It needs to further explain that, the at least one first camera 12 has a total photographic coverage, and the total photographic coverage has a first width greater than a second width of the continuous web material 3.

According to the present invention, the first subprogram 131 is compiled to be integrated in the application program by one type of programming language, and includes instructions for configuring the processor to apply the at least one image process to the at least one material image for generating a first material feature image, and to extract a plurality of defect features from the first material feature image. On the other hand, the second subprogram 132 is compiled to be integrated in the application program by one type of programming language, and includes instructions for configuring the processor to determine whether there are existing any defects in the first segment 31 of the continuous web material 3 by matching the plurality of defect features with a plurality of reference defect features.

As described in more detail below, the third subprogram 133 is compiled to be integrated in the application program by one type of programming language, and includes instructions for configuring the processor to stop the first motor 210 of the unwinding unit 21, the at least one second motor 220 of the inspection unit 22, and the third motor 230 of the winding unit 21 from running in case of there being at least one defect detected from the first segment 31 of the continuous web material 3, so as to make the first segment 31 of the continuous web material 3 be positioned on an inspection platform 222 of the inspection unit 22. FIG. 3 also depicts that the motor controlling system 1 of the present invention further includes a first rotation speed sensor S1, a second rotation speed sensor S2 and a third rotation speed sensor S3, in which the first rotation speed sensor S1 is connected to the first motor 210 for monitoring a first rotation speed of the first motor 210, the second rotation speed sensor S2 is connected to said second motor 220 for monitoring a second rotation speed of said second motor 220, and the third rotation speed sensor S3 is connected to the third motor 230 for monitoring a third rotation speed of the third motor 230.

Moreover, the fifth subprogram 135 is compiled to be integrated in the application program by one type of programming language, and includes instructions for configuring the processor to real-time monitor a movement of the continuous web material 3. During real-time monitoring the movement of the continuous web material 3, the processor calculates a first displacement of the continuous web material 3 based on the first rotation speed of the first motor 210 sensed by the first rotation speed sensor S1 and the second rotation speed of said second motor 220 sensed by the second rotation speed sensor S2, and also calculates a second displacement of the continuous web material 3 based on the second rotation speed and the third rotation speed of the third motor 320 sensed by the third rotation speed sensor S3.

Therefore, by properly controlling the rotation of the first motor 210, the at least one second motor 220 and the third motor 230, the first segment 31 of the continuous web material 3 is eventually stopped in the inspection platform 222 of the inspection unit 22. In such case, an inspector standing at the front of the operation table 24 is allowed to judge whether the defects in the first segment 31 is repairable or not. If yes, the inspector repairs the defects; otherwise, the inspector patches a label on said defect. Eventually, the inspector operates the human machine interface of the modular electronic device to transmit a transmission restarting command to the processor, such that the processor restarts the first motor 210, said second motor 220 and the third motor 230 to run by the first rotation speed, the second rotation speed and the third rotation speed, respectively.

Second Embodiment

Figure 6:
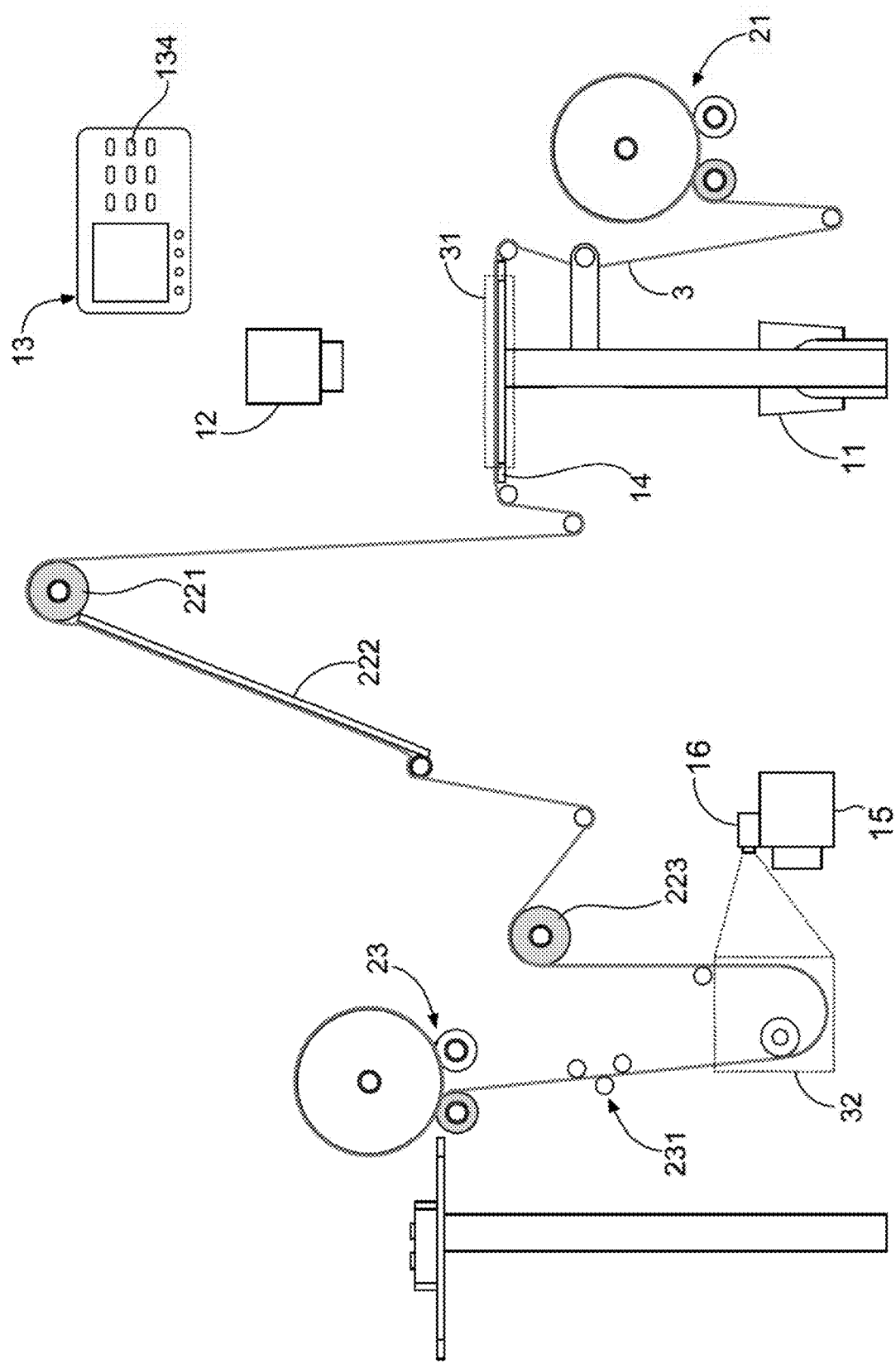
FIG. 6 shows a second side view of the unwinding unit, the inspection unit, the winding unit, and the operation table they are shown in FIG. 1.
Figure 7:
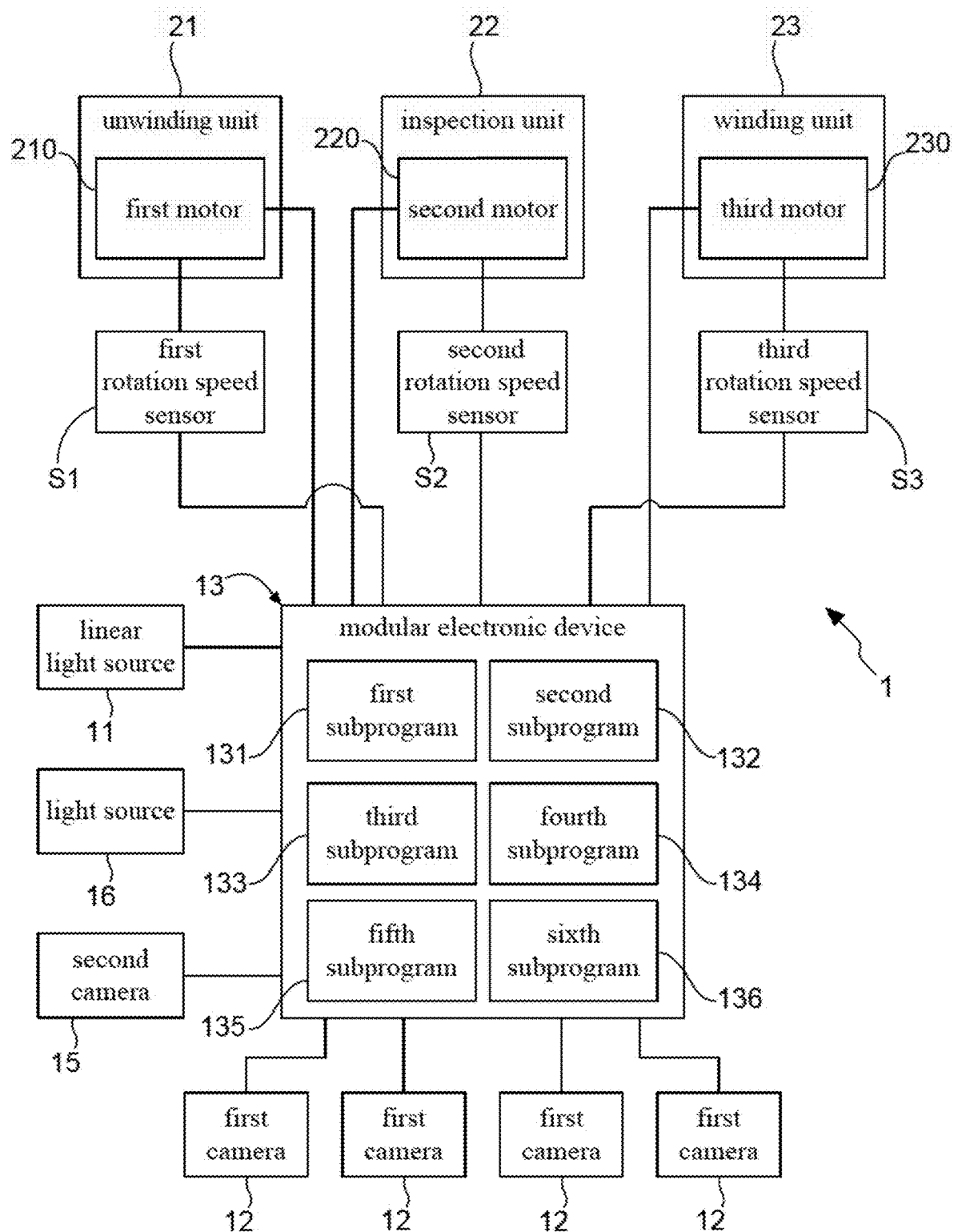
FIG. 7 shows a second block diagram of the motor controlling system according to the present invention.

Referring to FIG. 1 and FIG. 2 again, and please simultaneously refer to FIG. 6, in which a second side view of the unwinding unit 21, the inspection unit 22, the winding unit 23, and the operation table 24 is provided. On the other hand, FIG. 7 illustrates a second block diagram of the motor controlling system 1. As FIG. 1, FIG. 2, FIG. 6, and FIG. 7 show, the motor controlling system 1 of the present invention can be designed to further include a light source 16 and a second camera 15, in which the light source 16 is coupled to the modular electronic device 13, and is disposed at a third position for facing a second photographing region between the inspection unit 22 and the winding unit 23. On the other hand, the second camera 15 is coupled to the modular electronic device 13, and is disposed at a fourth position for facing the second photographing region.

Moreover, because there are the first subprogram 131, the second subprogram 132, the third subprogram 133, and the fourth subprogram 134 stored in the memory of the modular electronic device 13, the processor is basically configured for:

(i) controlling the light source 16 to emit a second detection light for irradiating the second photographing region in case of the winding unit 23 running to wind the continuous web material 3 by a material winding speed;

(ii) controlling the second camera 15 to acquire a second image frame from a second segment 32 of the continuous web material 3 in the second photographing region; and (iii) applying at least one image process to the at least one material image, so as to generate a second material feature image.

It is worth noting that, FIG. 7 further depicts that there is a sixth subprogram 136 compiled to be integrated in the application program by one type of programming language, where the sixth subprogram 136 includes instructions for configuring the processor to extract a plurality of material features from the second material feature image, and then to estimate a winding tension of the second segment 32 of the continuous web material 3 based on the plurality of material features. Therefore, when the winding tension is less than a lower threshold value or greater than an upper threshold value, the modular electronic device 13 transmits a tension adjustment command to the apparatus 2, such that the apparatus 2 controls a tension adjusting assembly 231 of the winding unit 23 so as to properly regulate the winding tension.

Therefore, through above descriptions, all embodiments and their constituting elements of the motor controlling system 1 proposed by the present invention have been introduced completely and clearly; in summary, the present invention includes the advantages of:

(1) When this motor controlling system 1 integrated in a fabric inspection machine works normally, in case of a segment 31 of a fabric (i.e., the continuous web material 3) is detected to have at least one defect, the motor controlling system 1 controls a plurality of motors of the fabric inspection machine to properly run, thereby transferring the segment 31 to be positioned on an inspection platform, without needing manual controls made by an inspector.

(2) after the inspector repairs the defects and/or patches a label on each of the defects, the motor controlling system 1 restarts the transmission of the fabric (i.e., the continuous web material 3), so as to make the segment 31 be wound by a winding unit 23 of the fabric inspection machine, without needing manual controls made by the inspector. As a result, after repeating several times of the stopping and the restarting of the transmission of the fabric, two end sides of a fabric roll that is wound on the winding unit both have a flat profile.

Therefore, above descriptions have introduced the motor controlling system for application in an apparatus having roll-to-roll mechanism proposed by the present invention completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. A motor controlling system, being integrated in apparatus comprising an inspection unit and a roll-to-roll mechanism consisting of an unwinding unit and a winding unit, and comprising:
   a linear light source, being disposed at a first position for facing a first photographing region between the unwinding unit and the inspection unit;
   at least one first camera, being disposed at a second position for facing the first photographing region; and
   a modular electronic device, being coupled to the linear light source and the at least one first camera, and comprising a processor, a memory and a human machine interface (HMI), wherein the memory stores an application program, and the processor being coupled to the memory and the human machine interface;
   wherein the application program includes instructions, such that in case the application program is executed, the processor being configured for:
   controlling the linear light source to emit a first detection light for irradiating the first photographing region in case of a roll of a continuous web material being discharged by the unwinding unit by a feeding speed;
   controlling the at least one first camera to acquire at one material image frames from a first segment of the continuous web material that is in the first photographing region;
   applying at least one image process to the at least one material image, so as to generate a first material feature image;
   extracting a plurality of defect features from the first material feature image, and then determining whether there are existing any defects in the first segment of the continuous web material by matching the plurality of defect features with a plurality of reference defect features;
   stopping a first motor of the unwinding unit, at least one second motor of the inspection unit, and a third motor of the winding unit from running in case of there being at least one defect detected from the first segment of the continuous web material, so as to make the first segment of the continuous web material be positioned on an inspection platform of the inspection unit;
   restarting the first motor, the at least one second motor and the third motor to run after receiving a transmission restarting command transmitted by the human machine interface.

2. The motor controlling system of claim 1, wherein the continuous web material is selected from a group consisting of fabric, meal foil, metal thin sheet, touch panel, flexible circuit board, and flexible solar cell.

3. The motor controlling system of claim 1, further comprising:
   a first rotation speed sensor, being connected to the first motor for monitoring a first rotation speed of the first motor;
   a second rotation speed sensor, being connected to said second motor for monitoring a second rotation speed of said second motor;
   a third rotation speed sensor, being connected to the third motor for monitoring a third rotation speed of the third motor.

4. The motor controlling system of claim 3, wherein after the human machine interface transmits the transmission restarting command to the processor, the processor restarting the first motor, said second motor and the third motor to run by the first rotation speed, the second rotation speed and the third rotation speed, respectively.

5. The motor controlling system of claim 4, wherein the at least one first camera acquires the at least one material image from the first segment of the continuous web material by a shutter speed, and the shutter speed being positively correlated to the feeding speed.

6. The motor controlling system of claim 4, wherein the application program consists of a plurality of subprograms, and the plurality of subprograms comprising:
   a first subprogram, being compiled to be integrated in the application program by one type of programming language, and including instructions for configuring the processor to apply the at least one image process to the at least one material image for generating the first material feature image, and to extract the plurality of defect features from the first material feature image;
   a second subprogram, being compiled to be integrated in the application program by one type of programming language, and including instructions for configuring the processor to determine whether there are existing any defects in the first segment of the continuous web material by matching the plurality of defect features with the plurality of reference defect features;
   a third subprogram, being compiled to be integrated in the application program by one type of programming language, and including instructions for configuring the processor to stop the first motor, said second motor and the third motor from running, or restarting the first motor, said second motor and the third motor to run;
   a fourth subprogram, being compiled to be integrated in the application program by one type of programming language, and including instructions for configuring the processor to control the at least one first camera; and
   a fifth subprogram, being compiled to be integrated in the application program by one type of programming language, and including instructions for configuring the processor to real-time monitor a movement of the continuous web material.

7. The motor controlling system of claim 1, further comprising:
   a supporting framework, being disposed in the first photographing region, and being adapted for supporting the first segment of the continuous web material, thereby making the first segment be laid out in the first photographing region.

8. The motor controlling system of claim 1, wherein the at least one camera has a total photographic coverage, and the total photographic coverage having a first width greater than a second width of the continuous web material.

9. The motor controlling system of claim 1, wherein the modular electronic device is integrated in a control box of the apparatus.

10. The motor controlling system of claim 1, wherein the modular electronic device is an electronic device coupled to a control box of the apparatus, and the electronic device is selected from a group consisting of industrial computer, desktop computer, laptop computer, and all-in-one computer.

11. The motor controlling system of claim 6, further comprising:
    a light source, being coupled to the modular electronic device, and being disposed at a third position for facing a second photographing region between the inspection unit and the winding unit;

a second camera, being coupled to the modular electronic device, and being disposed at a fourth position for facing the second photographing region;

wherein in case the application program is executed, the processor being configured for:

controlling the light source to emit a second detection light for irradiating the second photographing region in case of the winding unit running to wind the continuous web material by a material winding speed;

controlling the second camera to acquire a second image frame from a second segment of the continuous web material in the second photographing region; and applying at least one image process to the plurality of time-consecutive material image frames, so as to generate a second material feature image.

12. The motor controlling system of claim 11, wherein the plurality of subprograms further comprising a sixth subprogram, being compiled to be integrated in the application program by one type of programming language, and including instructions for configuring the processor to extract a plurality of material features from the second material feature image, and then to estimate a winding tension of the second segment of the continuous web material based on the plurality of material features.

13. The motor controlling system of claim 12, wherein the modular electronic device transmits a tension adjustment command to the apparatus in case the winding tension is less than a lower threshold value or greater than an upper threshold value, such that the apparatus controls a tension adjusting assembly of the winding unit so as to properly regulate the winding tension.

* * * * *